Jan. 14, 1930. W. T. McCARTHY 1,743,787
MEANS FOR OPERATING CAMERAS FROM A DISTANCE
Filed March 29, 1928
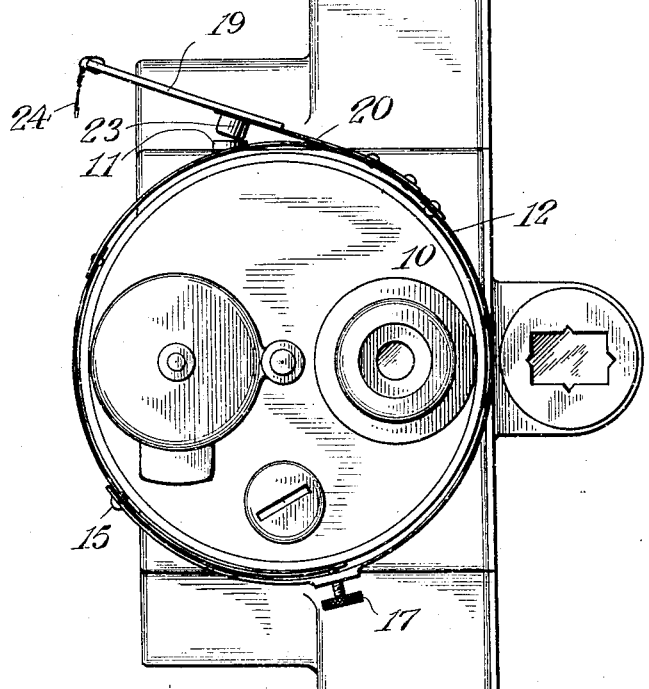
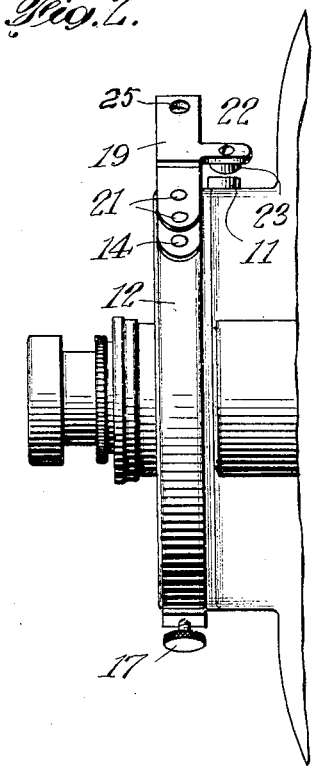
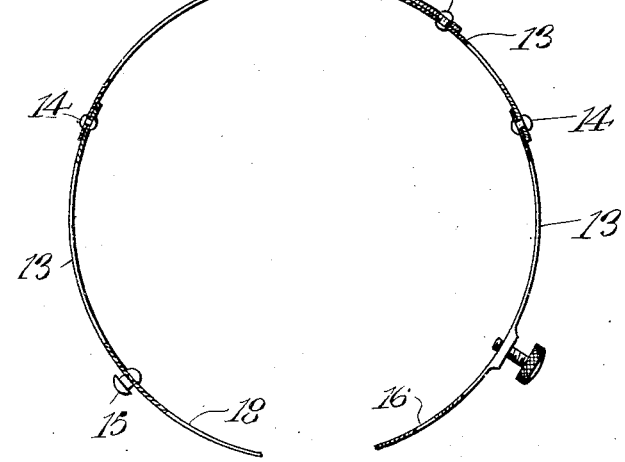
INVENTOR.
William T. McCarthy
BY Hoguet and Neary
ATTORNEYS.

Patented Jan. 14, 1930

1,743,787

UNITED STATES PATENT OFFICE

WILLIAM T. McCARTHY, OF BROOKLYN, NEW YORK

MEANS FOR OPERATING CAMERAS FROM A DISTANCE

Application filed March 29, 1928. Serial No. 265,806.

The present invention relates to an improved means for operating a camera from a distance and more particularly to an improved attachment for a camera and specifically a motion picture camera.

Among the principal objects which the invention has in view are: To provide an attachment which may be conveniently placed on and removed from the camera; to construct the attachment such that it may be manipulated easily and conveniently from a distance as by a string or cord, and upon manipulation, cause the camera to function; to simplify and improve the construction.

Other objects and advantages of the invention will appear as the description proceeds.

In the drawings:

Figure 1 is a front elevational view of a motion picture camera of conventional form, with the novel attachment of my invention applied thereto;

Figure 2 is a side elevational view of the camera and attachment; and

Figure 3 is an isolated elevational view, partly in section, of the attachment.

The drawings show the attachment applied to a conventional form of motion picture camera having a circular lens mount, 10, and of the automatic type with a push button, 11, for setting the camera in operation. The push button is normally biased to outward position, and, when depressed by the finger, serves to set the camera to taking pictures. The push button is located slightly behind the circular lens mount of the camera, which, as stated, is of conventional and well known form and requires no further illustration.

The attachment of this invention comprises means for actuating the push button and means for attachment to the camera. The attaching means is embodied in a split circular clamping ring, 12, which, as shown in Figure 3, may be made up of short curved links, 13, pivoted together as by rivets, 14, permitting relative movement for convenient disposition in service. The split ring is resilient and normally assumes an expanded or open position such as shown in Figure 3. The ring is clamped on the periphery of the circular lens mount, 10, of the camera, and the two ends assume the overlying position shown in Figure 1, and are held in such position by a projection 15, on one of the ends which engages in an aperture, 16, in the other end. The ring may be conveniently placed on and taken off the camera as the projection, 15, and aperture, 16, may be easily snapped together or withdrawn from cooperation. When the ring is disposed in service on the camera, it may be more firmly held in place thereon by means of a set-screw, 17, which extends through a slot, 18, in the inner end of the ring, the set-screw being associated with the ring and, upon tightening, serving to firmly engage the camera, thereby securely attaching the ring thereto.

The means for actuating the push button embodies a projecting element, 19, which is permanently associated with the split ring or attaching means and is preferably carried on one end of a leaf spring, 20, the other end of which is attached to the split ring by fastening members or rivets, 21. The projecting element, 1919, has an off-set portion, 22, extending over the push button of the camera and a protuberance, 23, on the off-set portion strikes and depresses the push button upon depression of the element, 19. The leaf spring, 20, normally serves to maintain the element, 19, in a position such that the protuberance, 23, is spaced from the push button. The depression of the element, 19, and consequent actuation of the push button which causes the camera to function is achieved by a cord, 24, tied to the end of the element, 19, preferably through a small hole, 25, therein. This cord may be of any length so as to be manipulated from any distance, and the operation of the camera may be controlled from any desired distance merely by manipulating the cord.

From the foregoing, it will be seen that I have provided an attachment for a camera whereby the camera may be operated from a distance. The invention finds utility in a number of applications, such as the taking of animated pictures and pictures including the camera operator and wherever operation of the camera from a distance is desired. The attachment is simple and cheap to manufacture, it is dependable in performance, and may be readily attached or removed from the camera when desired. It is also of small and compact size and can be carried conveniently. The provision of the pivoted links for the split ring is a nice feature, as the links may be folded on one another to reduce the size of the attachment for convenient placement in the box of the camera.

I claim as my invention:—

1. An attachment for a camera with a circular lens mount and operated by a push button, comprising a split ring adapted to be removably clamped around the periphery of the lens mount, an element carried by the split ring and adapted to be arranged in spaced relation to the push button, means for manipulating said element from a distance, and means associated with the element for striking and depressing the push button when the element is manipulated.

2. An attachment according to claim 1, in which the split ring is formed of a plurality of curved links pivoted together.

3. An attachment for a camera operated by a push button carried in the lens mount, comprising a frame adapted to be removably seated around said lens mount, an element carried by the frame and adapted to be arranged in spaced relation to, and to be brought into operative engagement with, said push button, and means for manipulating said element from a distance.

4. An attachment for a camera operated by a mechanism releasing element carried in the lens mount, comprising a frame adapted to be removably seated around said lens mount, an element carried by the frame and adapted to be arranged in spaced relation to, and to be brought into operative engagement with, said mechanism releasing element, and means for manipulating said element from a distance.

5. An attachment for a camera operated by a mechanism releasing element adjacent the lens mount, comprising a frame adapted to be removably seated around said lens mount, a spring arm carried by the frame, spaced from, but adapted to be brought into operative engagement with, said mechanism releasing element, and means for actuating said spring arm at a distance from the camera.

In testimony whereof, I have signed my name to this specification this 27th day of March, 1928.

WILLIAM T. McCARTHY.